Figure 1:
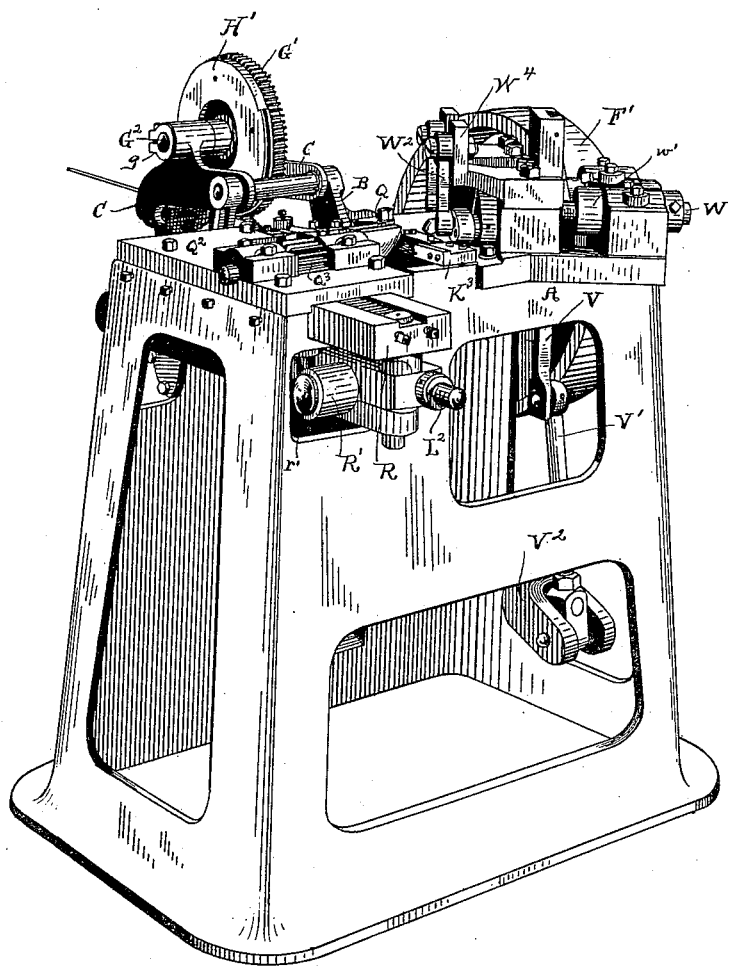

(No Model.) 10 Sheets—Sheet 1.

F. P. CADY.
CHAIN MAKING MACHINE.

No. 466,117. Patented Dec. 29, 1891.

Witnesses
Inventor
F. P. Cady
By his Attorneys
Hall and Fay (No Model.)

10 Sheets—Sheet 2.

F. P. CADY.
CHAIN MAKING MACHINE.

No. 466,117.

Patented Dec. 29, 1891.

Witnesses
N. S. Amstutz
E. E. Pate

Inventor
F. P. Cady
By his Attorneys
Hall and Fay (No Model.) 10 Sheets—Sheet 3.

F. P. CADY.
CHAIN MAKING MACHINE.

No. 466,117. Patented Dec. 29, 1891.

WITNESSES. INVENTOR.
N. S. Amstutz F. P. Cady
E. E. Pate BY his ATTORNEYS
Nall and Fay

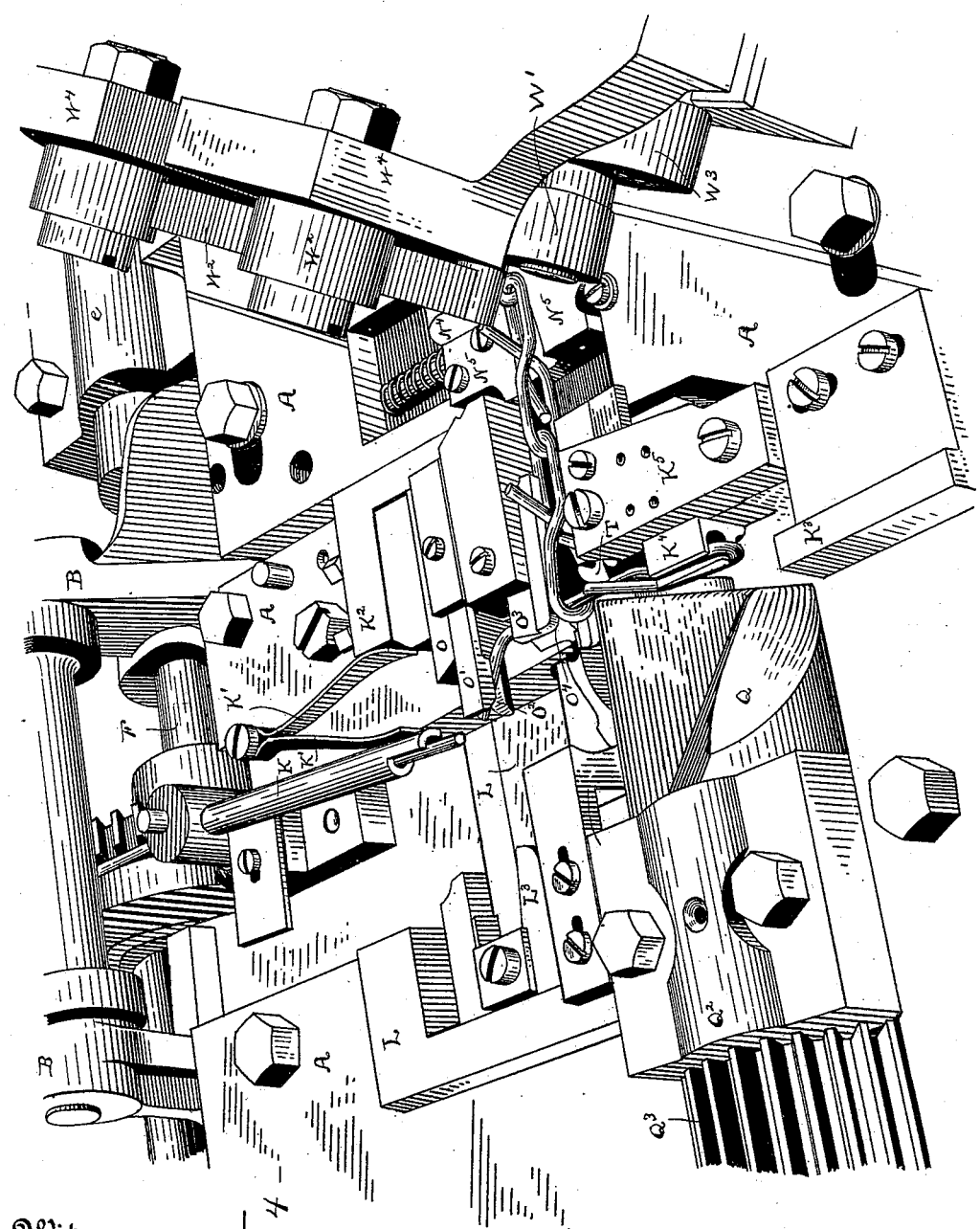

(No Model.) 10 Sheets—Sheet 5.
F. P. CADY.
CHAIN MAKING MACHINE.
No. 466,117. Patented Dec. 29, 1891.
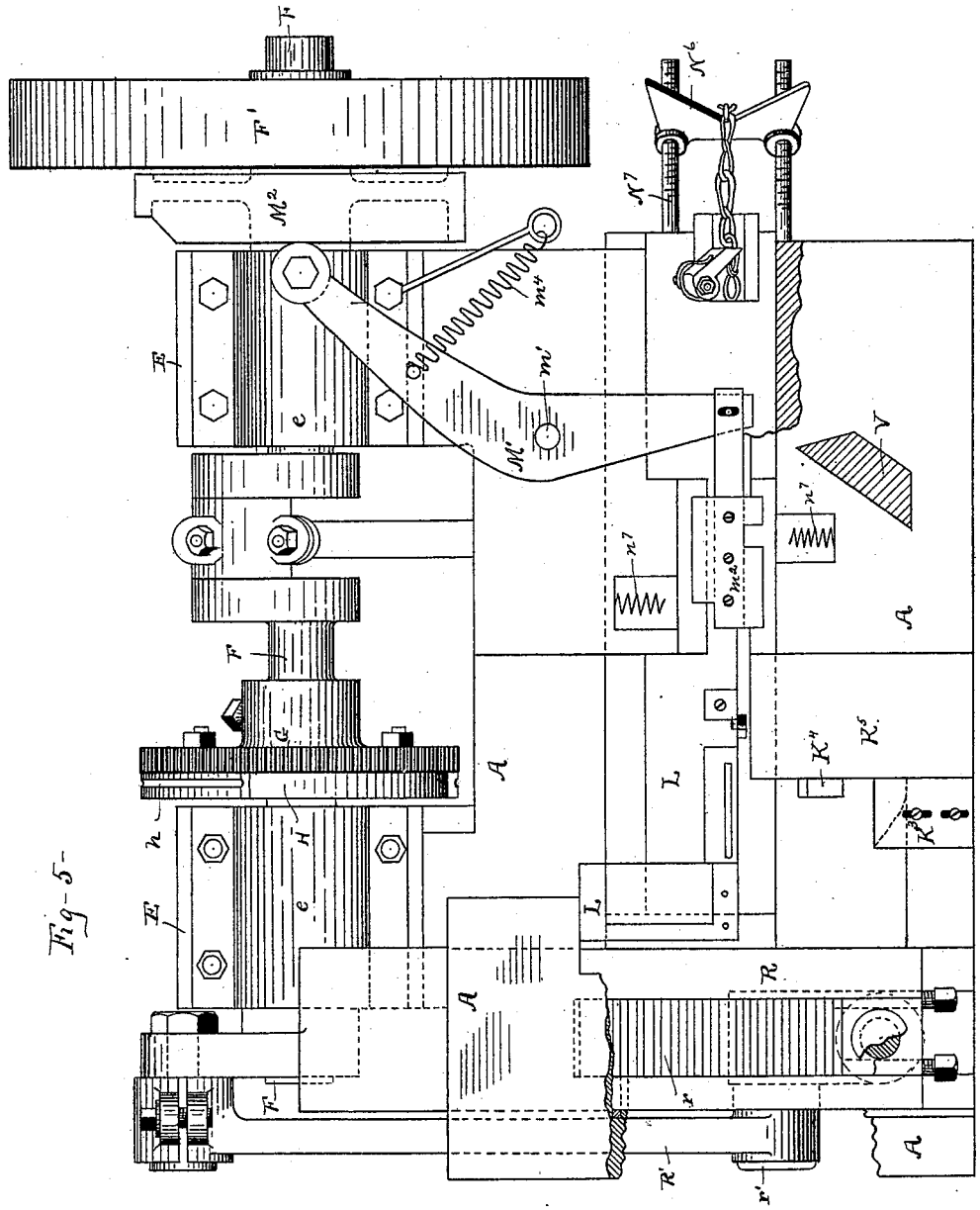
Fig-5-
Witnesses
N. S. Amstutz
E. E. Pate
Inventor
F. P. Cady
By his Attorneys
Nall and Fay

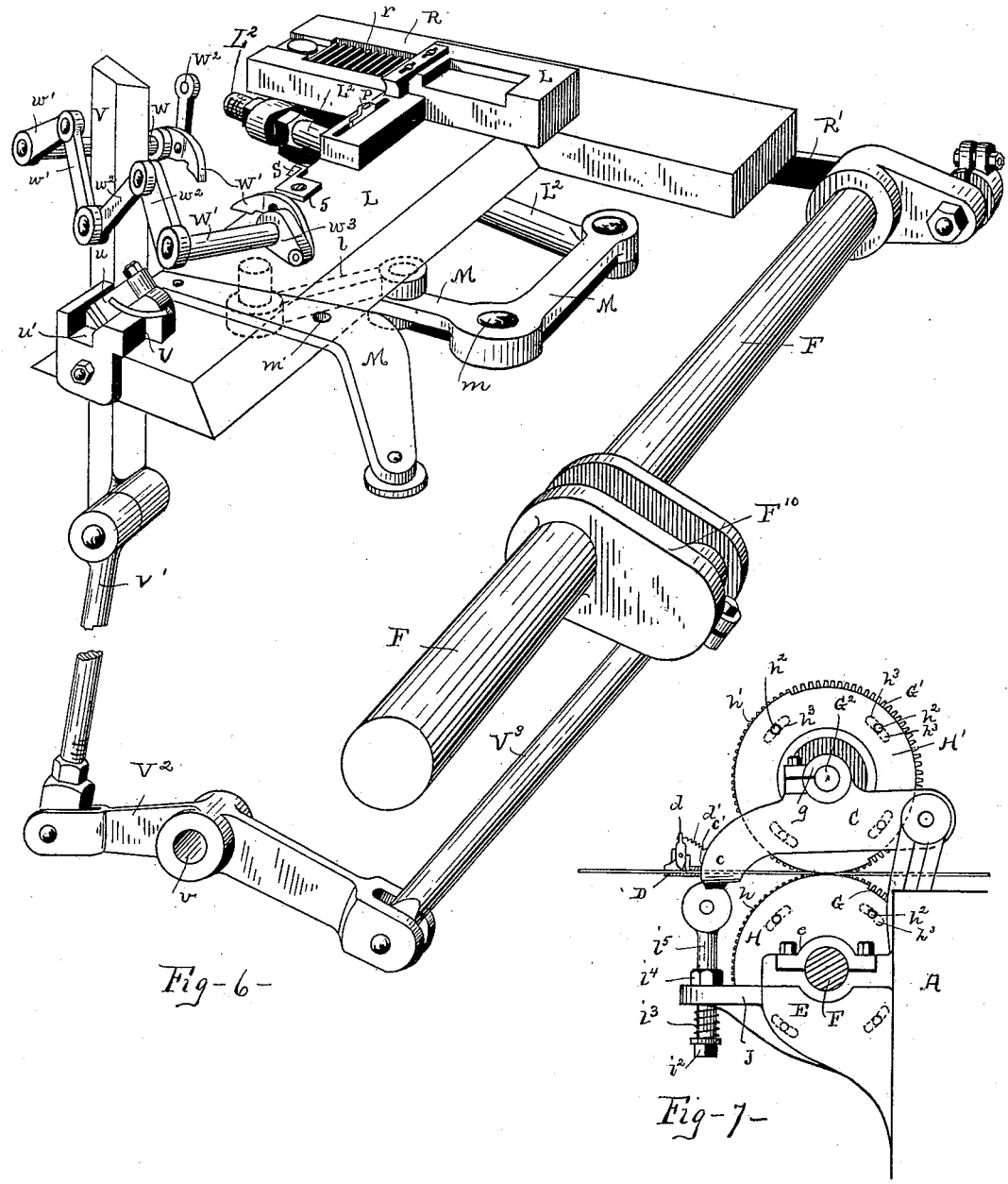
Fig-6-
Fig-7-

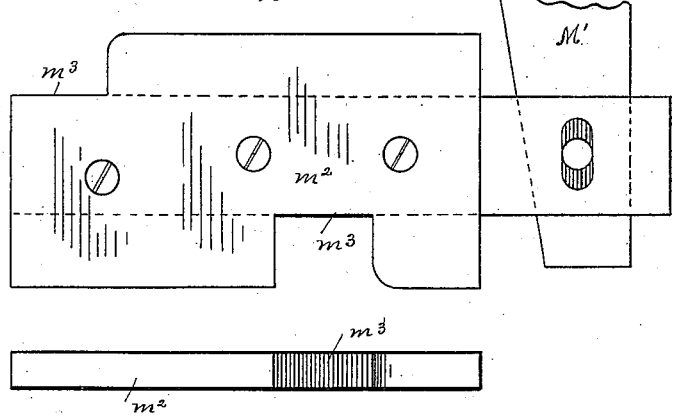
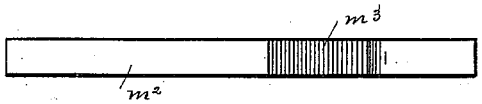
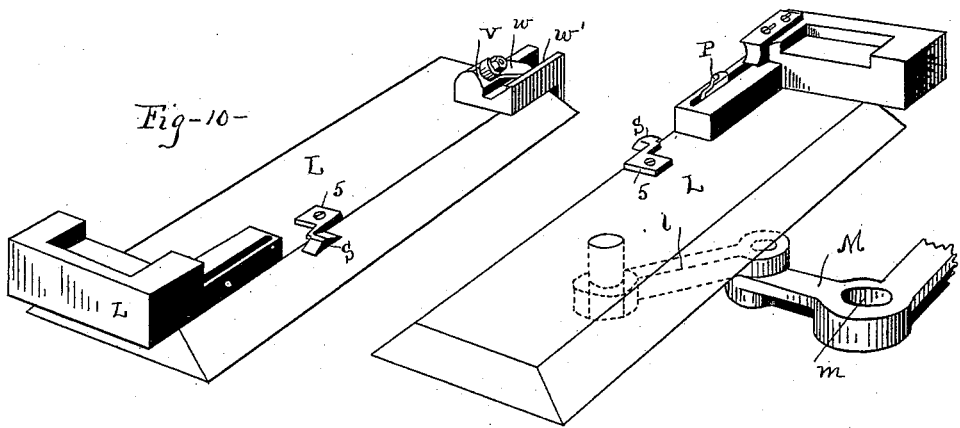
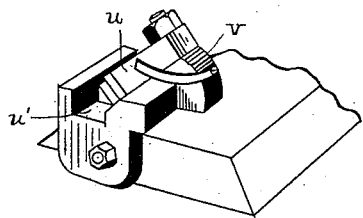

(No Model.) 10 Sheets—Sheet 8.
F. P. CADY.
CHAIN MAKING MACHINE.
No. 466,117. Patented Dec. 29, 1891.
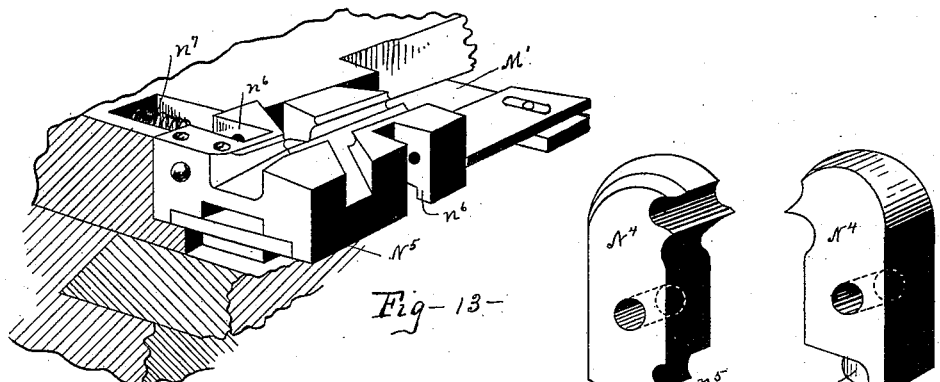
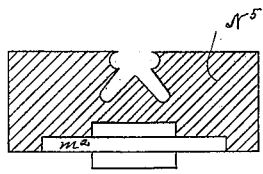
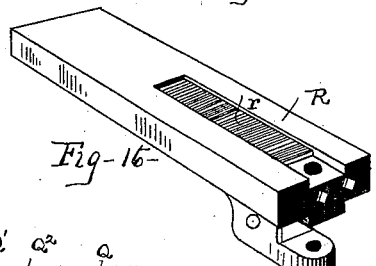
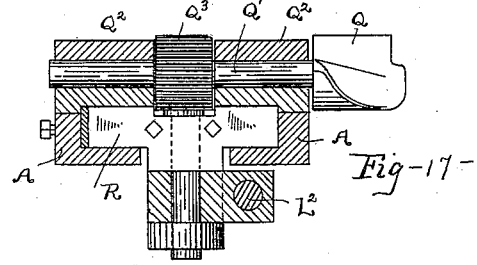
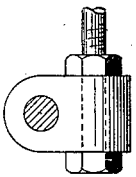
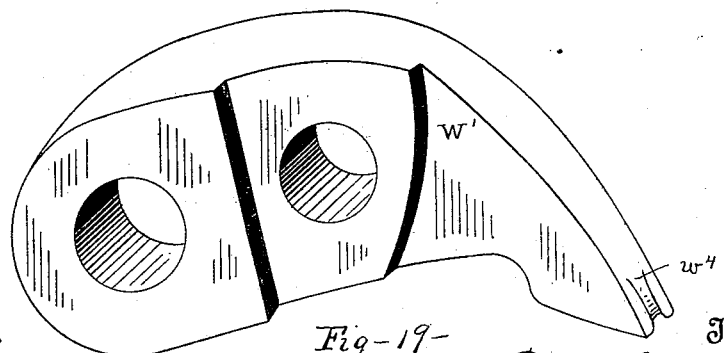
Witnesses
N. S. Amstutz
E. E. Pate
Inventor
F. P. Cady
By his Attorneys
Hall and Fay (No Model.) 10 Sheets—Sheet 9.
F. P. CADY.
CHAIN MAKING MACHINE.
No. 466,117. Patented Dec. 29, 1891.
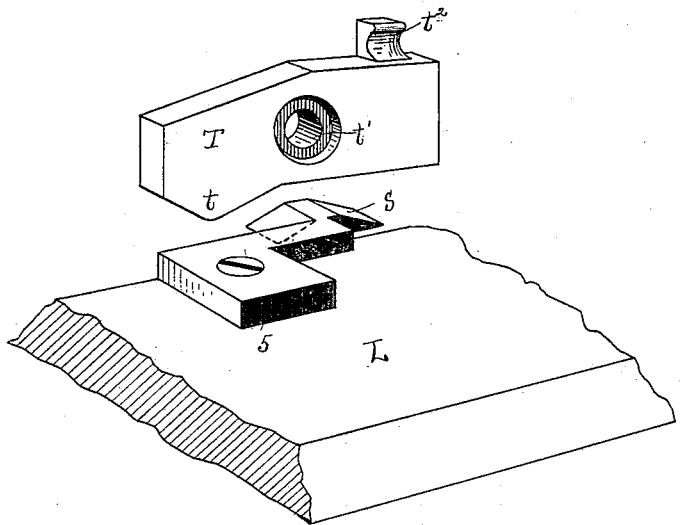
Fig-20-
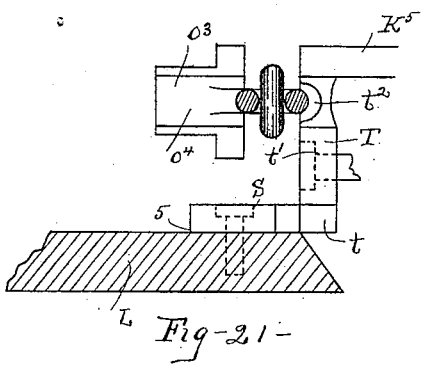
Fig-21-
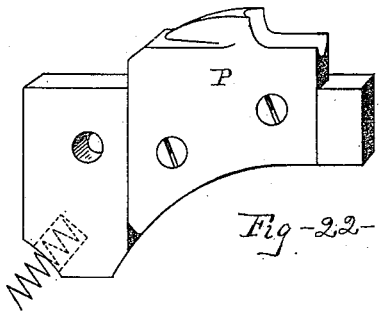
Fig-22-
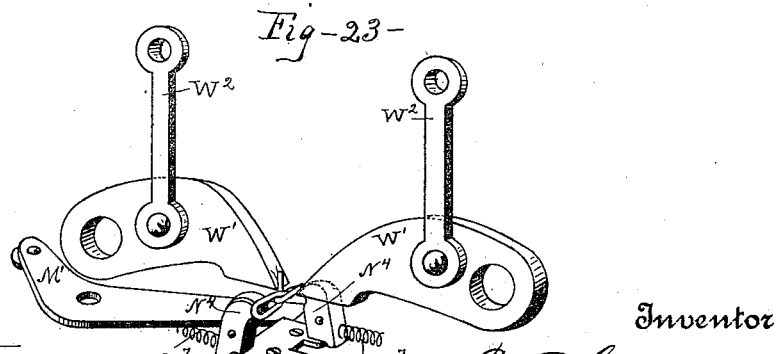
Fig-23-
Witnesses
N. S. Amstutz
O. E. Pate
Inventor
F. P. Cady
By his Attorneys
Hall and Fay
THE NORRIS PETERS CO., PHOTO-LITHO., WASHINGTON, D. C.

(No Model.) 10 Sheets—Sheet 10.
F. P. CADY.
CHAIN MAKING MACHINE.
No. 466,117. Patented Dec. 29, 1891.
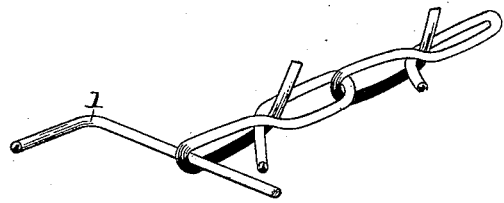
Fig-24-
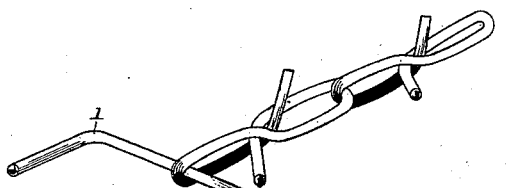
Fig-25-
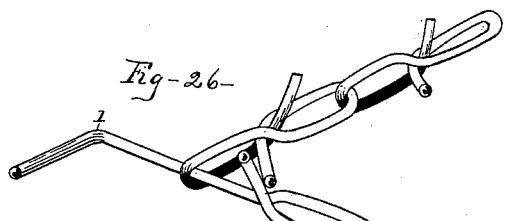
Fig-26-
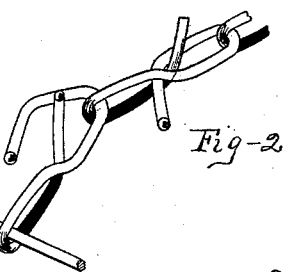
Fig-27-
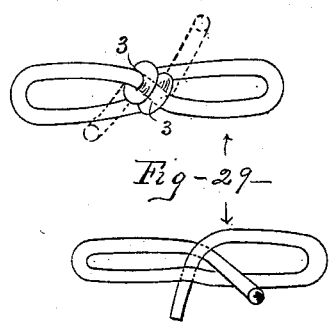
Fig-29-
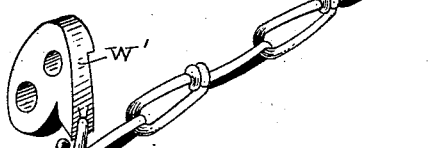
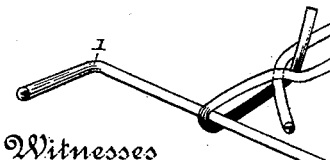
Fig-28-
Witnesses
N. S. Amstut
E. E. Pate
Inventor
F. P. Cady
By his Attorneys
Hall and Fay

UNITED STATES PATENT OFFICE.

FRANK P. CADY, OF CLEVELAND, OHIO, ASSIGNOR TO THE BRIDGEPORT CHAIN COMPANY, OF BRIDGEPORT, CONNECTICUT.

CHAIN-MAKING MACHINE.

SPECIFICATION forming part of Letters Patent No. 466,117, dated December 29, 1891.

Application filed July 28, 1890. Serial No. 360,129. (No model.)

*To all whom it may concern:*

Be it known that I, FRANK P. CADY, a citizen of the United States, and a resident of Cleveland, county of Cuyahoga, and State of Ohio, have invented certain new and useful Improvements in Chain-Making Machines, of which the following is a specification, the principle of the invention being herein explained and the best mode in which I have contemplated applying that principle so as to distinguish it from other inventions.

The objects of my invention are to provide improved means for forming and continuously connecting chain-links from wire or metal rod; to provide improved means for inserting the stock through one end of the finished link and then bending it to form another link; to provide improved means for forming one eye of a chain-link; to provide improved means for simultaneously cutting off the stock and bending the cut-off end of the link-stock to form the portion of the eye which is wrapped around the middle of the link; to provide improved means for holding, bending, and releasing the link when its second eye is formed; to provide improved means for wrapping the projecting ends of the link around the middle of the same; to provide improved means for holding the link while wrapping its ends; to provide improved means for feeding the finished chain forward; to provide improved means for guiding the finished chain, and to provide improved means for feeding the stock.

The annexed drawings and the following description set forth in detail one mechanical form embodying the invention, such detail construction being but one of various mechanical forms in which the principle of the invention may be used.

Figure 2:
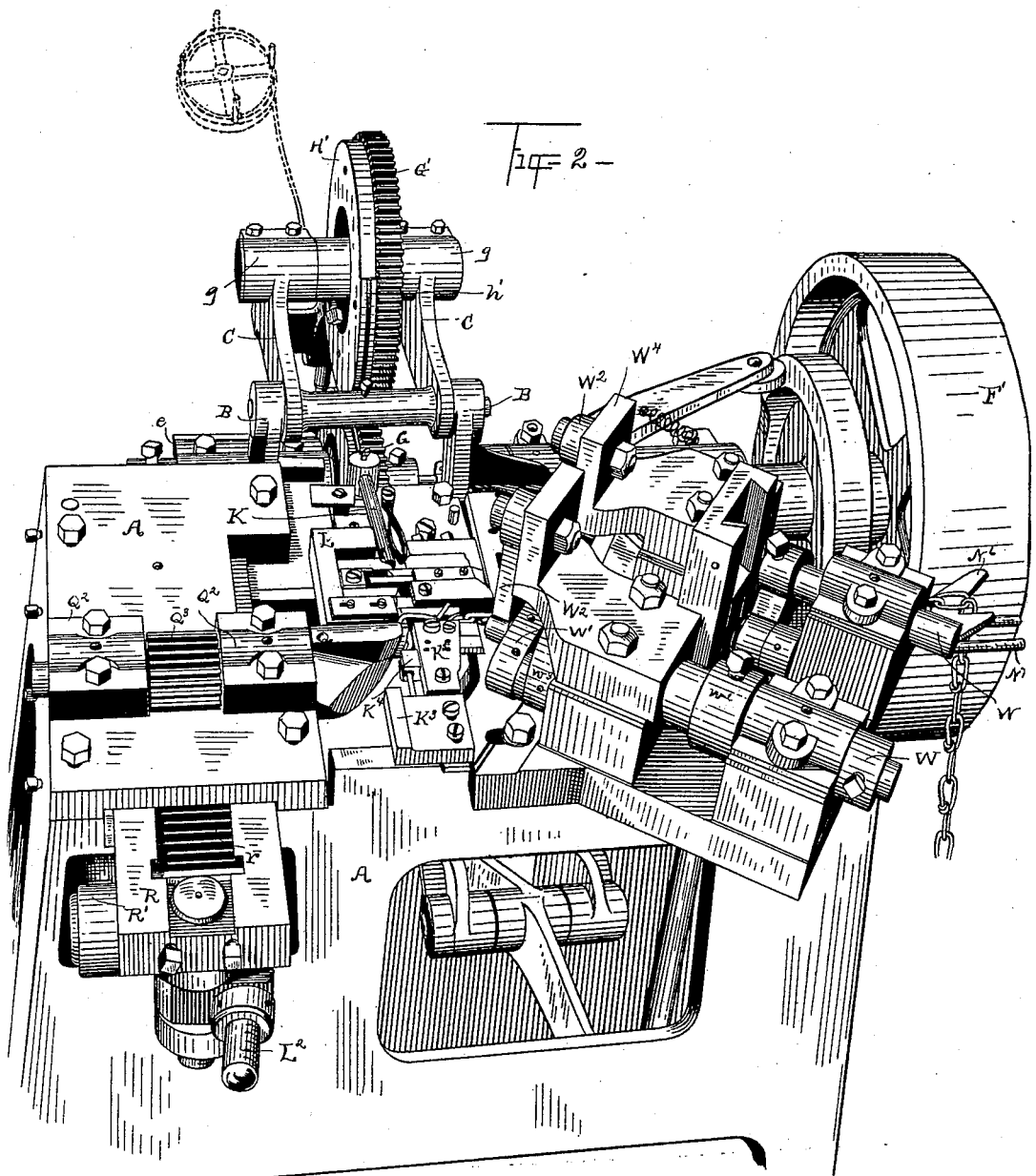
Figure 3:
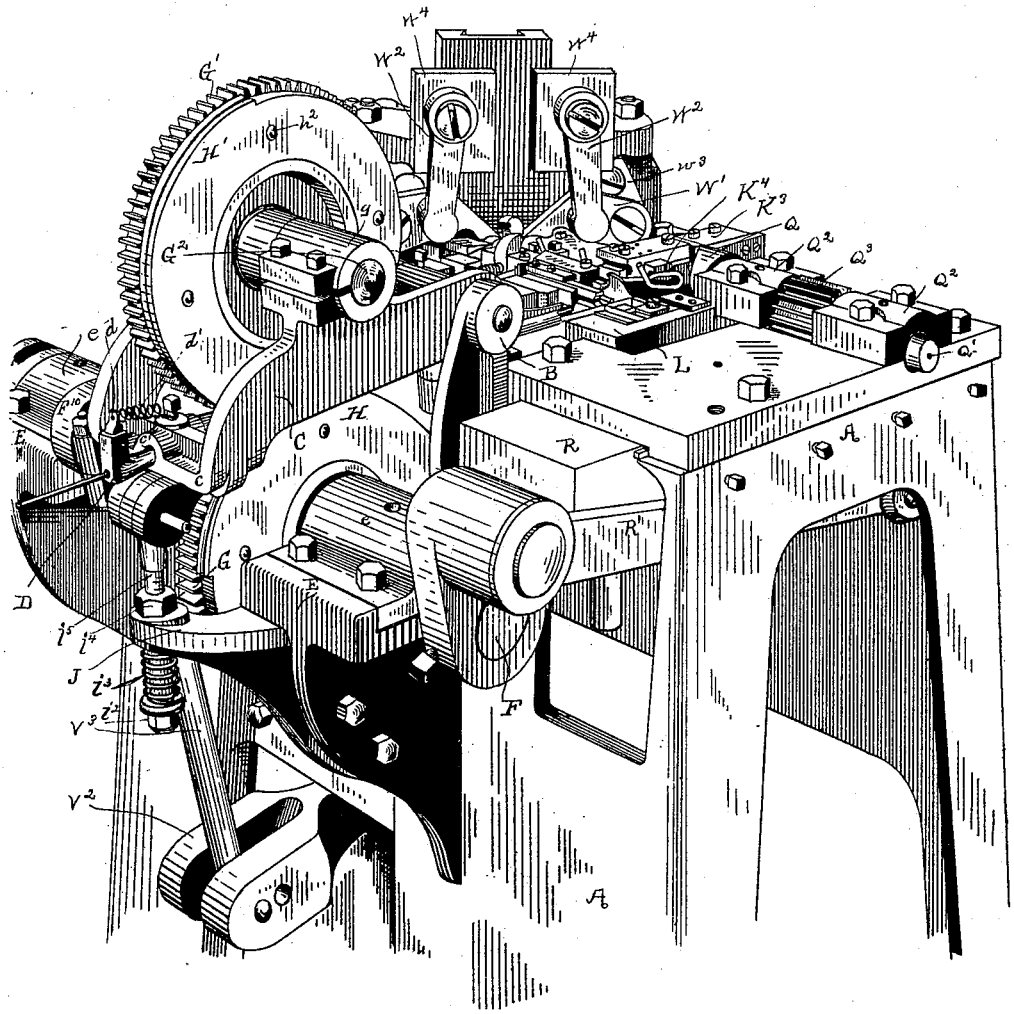

In said annexed drawings, Figure 1 represents a perspective view of my improved chain-making machine; Fig. 2, an enlarged perspective view of the upper portion of the machine, seen from the forward side and from above; Fig. 3, an enlarged perspective view of the upper portion of the machine, seen from the rear and from above; Fig. 4, a still more enlarged perspective view of a part of the top of the machine, seen from above; Fig. 5, a top plan view of the machine, the upper parts of the mechanism being removed; Fig. 6, a perspective view of the principal operative parts of the machine, showing them detached from their bearings and supports; Fig. 7, a side view of the stock-feeding mechanism; Fig. 8, a top plan view of the slide which operates the link-holding jaws; Fig. 9, an edge view of said slide; Figs. 10, 11, and 12, perspective detail views of the transverse slide which carries the cutter, link-bending head, link-forming head, and chain-feeding pawl; Fig. 13, a perspective view of the link-holding block; Fig. 14, a transverse section of the same; Fig. 15, a perspective view of the link-holding jaws; Fig. 16, a perspective view of the rack-slide; Fig. 17, a transverse sectional detail view illustrating the revolving forming-head and its actuating-rack slide; Fig. 18, a detail view of the connection between the rack-slide and the rod which actuates the transverse slide; Fig. 19, a perspective view of one of the wrapping-jaws for wrapping the free ends of the link-eyes around the link; Fig. 20, a perspective detail view of the mechanism for operating the head, which forms and holds the link while the second eye is formed; Fig. 21, a transverse section of said mechanism; Fig. 22, a perspective detail view of the link-forming head; Fig. 23, a perspective detached view of the mechanism for wrapping the free ends of the link; and Figs. 24 to 29, inclusive, perspective views of the chain-links and stock at the successive steps of formation.

In the drawings, the letter A indicates the supporting-frame of the machine, which frame may be of any suitable construction. Two upright brackets B B are provided at the rear edge of the top of the frame, and the ends of a double yoke C are pivoted between the upper ends of said brackets. The cross-piece $c$, which forms the rear end of said yoke, is formed with a bore $c'$, in which a guide-tube D is secured. A dog $d$ is pivoted in said tube, and has a spring $d'$ secured to it and to the frame, said spring serving to bring the dog into engagement with the stock, so as to prevent its passing rearward in the guide-tube, while freely permitting its forward passage. A bolt $i^3$ is pivoted with its upper end between two lips projecting from the under side of the cross-piece $c$ of the yoke, and the lower screw-threaded portion of this bolt passes through a hole in a rearwardly-projecting arm J upon the frame, and has a nut $i^4$, which may bear against the upper side of said arm and serve as an adjustable stop to limit its downward movement. A nut $i^2$ upon the lower end of the bolt confines a spring $i^3$ upon the bolt, and this spring bears against the under side of the arm, and thus serves to draw the rear end of the pivoted yoke downward.

Two brackets E E project rearwardly from the frame and have bearings $e$, in which a main shaft F is journaled. Said shaft receives rotary motion from any suitable source through a pulley F', and has a cog-wheel G secured upon it. Said cog-wheel meshes with another similar cog-wheel G', the shaft $G^2$ of which is journaled in bearings $g$ upon the arms of the yoke. Feed-disks H and H' are fitted at the sides of the cog-wheels and are adjustably secured to the same by means of screw-bolts $h^2$, passing through the disks and into segmental slots $h^3$ in the cog-wheels. The peripheries of the feed-disks are cut away so as to leave segmental feed-treads $h$ and $h'$, which preferably are grooved to clamp and guide the stock. The feed-disks will be held in operative contact by means of the spring $i^3$, which will draw the upper feed-disk sufficiently tight against the lower disk to admit of a perfect feed, and at the same time a sufficient yield to irregularities or changes in the thickness of the wire stock fed between the disks. The beginning and end of the period of feeding the stock may be adjusted within certain limits relatively to the operation of the other parts of the machine by adjusting the feed-disks upon the faces of the cog-wheels.

A guide-tube K is pivoted at one end in the line of feed from the feed-disks, and the forward swinging end of said tube has a spring K' bearing against one side of it, so as to normally tilt the guide-tube to one side of the direct line of feed. Said spring is shown as V-shaped and with one arm bearing against the tube and the other against a stop $K^2$. The degree of divergence of the tube from the direct line of feed is controlled by an adjustable stop $k$ at the opposite side to the spring.

A stationary cutter O is adjustably secured upon the top of the frame at one side of the path of the stock, and a stationary end-bending head O' is adjustably secured forward of said cutter, projecting beyond the end of the latter, with its notched or recessed end $O^2$.

A stationary link-forming head $O^3$ is adjustably secured a short distance forward of the end-bending head and is formed with a horizontal notch in its end and with a rounded forward corner, which leads into a link-forming guideway formed between the head $O^3$ and a block $K^5$, secured forward of said head and a short distance from the same, the guideway or groove serving to guide the link when its second eye is formed.

A mandrel $K^4$ is formed upon the face of the block $K^5$ and has a horizontal groove in its face, which groove registers with the notch in the link-forming head and is directly in the path of the stock.

A stop $K^3$ is secured longitudinally adjustable upon the top of the frame and directly opposite the path of the stock, so as to stop the stock in its forward passage, and thus gage the length of stock to be cut off.

A rack-slide R slides in longitudinal guides in the top of the frame and has a forwardly-projecting dropped lip $r^2$, into the side of which a pin $r'$ is inserted. A pitman R' is pivoted upon said pin and has its rear end pivotally connected to a crank $F^2$ upon the end of the revolving main shaft, so that the rack-slide may be reciprocated by the pitman from the shaft. The upper side of the rack-slide is formed with a cogged rack $r$, which meshes with a pinion $Q^3$ upon a shaft $Q'$, journaled in transverse bearings $Q^2$ at the forward edge of the frame-top. A rotary eye-forming head Q is formed at the end of said shaft and is opposite the stationary mandrel, and said head has a portion cut away so as to form eye-forming surfaces at an angle to each other, which surfaces may bend the stock which projects through the groove of the mandrel around the under side of the latter when said head is rotated, and thus form one eye of the link.

A bolt $r^3$ passes through the forward end of the rack-slide and through the lip $r^2$, and a block $R^2$ has a laterally-projecting ear $r^4$, which is pivoted upon said bolt between the rack-slide and the lip. A rod $L^4$ is secured longitudinally adjustable in a bore through said block $R^2$, and has its rear end pivoted to one arm of a bell-crank M, pivoted at $m$ to the frame. A connecting-rod $l$ is pivoted to the other arm of said bell-crank, and said rod has its other end pivoted to the under side of a transverse slide L, sliding beneath the top of the frame. By means of this connection the transverse slide may be reciprocated from the reciprocating rack-slide, and the pivotal joint between said slide and the rod $L^4$ admits of a perfectly free movement for the latter as it rocks the bell-crank, while the longitudinal adjustability of said rod admits of the stroke of the transverse slide being adjusted in relation to the stroke of the rack-slide.

A cutter $L^2$ is adjustably secured in the transverse slide L and registers with the stationary cutter O, so as to coact with the same, and an end-bending head $L^3$ is secured in the slide to register and coact with the stationary end-bending head O'.

A flat block P, having a curved, grooved, or recessed nose $p$ upon its upper side, is pivoted in a longitudinal slot $l'$ in the transverse slide L, and said block has a downwardly-projecting arm $p'$, against which a spring $p^2$ bears. The block, which I shall term the "movable link-forming head," may be tilted down into its groove against the thrust of the spring, so as to slip beneath the bent link upon its back stroke.

A double-faced cam S is secured at 5 upon the transverse slide and engages a double-faced cam enlargement $t$ upon a block T, which is pivoted at $t'$ upon that side of the guideway formed by the block $K^3$. The upper edge of said block has a lug $t^2$ at the end projecting toward the path of the stock, which lug has a rounded recess in the side facing the guideway.

A block U, having a guide-groove $u'$, is secured upon the end of the slide L, and a pawl or catch $u$ is pivoted over said groove, so as to successively engage the finished links of the chain as they are formed and feed the latter out at one side of the machine by the reciprocating movement of the slide.

A block $N^5$ is secured upon the top of the frame and is formed with a longitudinal link-holding groove $n'$, which forms a continuation of the guideway. The groove $n'$ is formed with two wings or smaller grooves $n^2$ at a right angle to each other and at angles of forty-five degrees to the surface of the block, so that the chain-link will be held in the groove with the free ends of its eyes projecting at both sides of the groove. The block has two recesses $n^6$ in its edges at opposite sides of the groove, and two link-holding jaws $N^4$, having their upper ends shaped to fit against and clamp the chain-link at both sides of its projecting ends are pivoted in the recesses and have springs $n^7$ bearing against their lower arms from the outside, said springs serving to keep the jaws open. A cam-plate $m^2$ slides beneath the grooved block $N^5$ and has recesses $m^3$ in its edges, said recesses having beveled edges, which may bear against the lower reduced ends $n^5$ of the jaws and force the upper ends of the jaws together to clamp the chain-link when the cam-plate is slid in one direction. A lever $M'$ is pivoted upon the top of the frame at $m'$ and has one end loosely pivoted to the cam-plate, and the other end carries a roller which bears against a cam $M^2$ upon the main shaft F. A spring $m^4$ is secured to the frame at one end and at the other end to the arm of the lever which carries the roller, and said spring serves to hold the roller in contact with the cam, so that it may follow the shape of its cam-surface.

A vertical slide-bearing $V^4$ is formed in an upright frame-piece $V^5$ upon the top of the frame, and a slide V reciprocates vertically in said bearing. Said slide V has a connecting-rod $V'$ pivoted to its lower end, and said connecting-rod is pivoted to one end of a lever $V^2$, pivoted at $v$, which derives rocking motion from the main shaft through a pitman $V^3$, pivoted to the lever and to a crank $F^{10}$ upon the main shaft.

Two shafts W W are journaled at the sides of the upright frame-piece $V^5$ to rock in suitable bearings, and said shafts have arms $w^2$ at one end and arms $w^3$ at the other ends. The arms $w^2$ at the outer ends of the rock-shafts W are connected to be rocked from the vertical slide by means of arms $w'$, pivoted to said slide and to the ends of said outer arms $w^2$, and the inner arms $w^3$ are pivotally connected to the outer ends of two end wrapping-jaws W' W', which are pivotally supported at about their middles from the upright frame-piece by means of swinging links $W^2$. The inner operative ends of said wrapping-jaws are suitably grooved or notched to engage the free projecting ends of the unfinished link and wrap them around the inner ends of the eyes of the same.

A plate $N^6$, having a V-shaped notch in its upper edge, is adjustably secured to tilt outward upon screw-threaded rods $N^7$ at the delivery end of the machine-frame, so as to have the links of the finished chain successively pass over its notched edge, and so as to prevent the chain from being drawn back by the transverse slide at the back stroke of the same, the plate being so adjusted upon the rods, according to the length of the links, that a link will be drawn over the notched edge of the plate by the weight of the previous links each time a link is formed, and the joint between the two links will rest in the V-shaped notch.

In practice the stock, which is metallic wire or rod, is placed upon a suitable reel or support and the end of the wire or rod is carried through the guide-tube in the swinging yoke of the feed mechanism. The dog $d$ in said guide-tube prevents the stock from being drawn back, and the stock is carried from the tube into the space between the feed-disks. The feed-treads upon said disks are adjusted to feed the stock forward at the proper point of their revolution, and the cut-away portions of said disks permit the stock to remain stationary, without being fed at the proper point of the revolution of the feed-disks, said disks producing in this manner an intermitting feed with a continuous revolution. The stock passes from the feed-disks to the pivoted guide-tube and is fed forward through the eye of the last-formed link until its end strikes the adjustable stop $K^3$, which, like the feed-disks, is adjusted for the required length of stock. The transverse slide moves in the meantime toward the stationary cutter, end-bending head, and link-forming head and brings the stock into the horizontal groove of the mandrel and finally cuts off the required length of stock, the pivoted guide-tube swinging to one side with the stock. As the link-blank is severed by the cutters the end-bending heads make the first bend for the end of one eye, and the other eye is formed around the mandrel by the rotary eye-forming head, whereupon the movable link-forming head engages the end of the previous link and pushes it through the guideway between the stationary link-forming head and the lug $t^2$ upon the rocking block T, which lug has been raised by the cam upon the transverse slide. This pushing of the movable head upon the end of the previous link causes said link to enter the groove in the link-holding block beneath the wrapping-jaws and causes the rear eye of said link to draw the blank with it between the stationary head and the lug, doubling that portion of the blank and forming the eye at that end. After the eyes of the link are thus formed the free ends of the eyes will cross each other and project at opposite sides of the link, each end through the opposite eye, and it is now necessary to wrap said ends around the middle portion of the link, so as to close the eyes. This is performed in the link-holding block, where the link is grasped by the link-holding jaws, while the wrapping-jaws above said block, by a compound swinging motion caused by their swinging support and connection to the rock-shaft, close the ends around the inner ends of the eyes at the middle of the link. The finished chain is fed link by link out of the machine by means of the pawl upon the transverse slide. The pivoted and spring-actuated guide-tube performs two functions—viz., it moves the end of the stock clear from the stationary cutter after a blank has been severed and it directs the feed of the stock perfectly clear of all the stationary parts. The metal of the blank receives a very gradual and easy bend by the rotary bending-head and by drawing or pushing the other eye into the guideway between the stationary head and the rocking lug. This latter lug is withdrawn, by means of the cam which operates it, as soon as the eye is bent, thus permitting free passage toward the discharge of the bent link.

Other modes of applying the principle of my invention may be employed for the mode herein explained. Change may therefore be made as regards the mechanism herein set forth provided the principles of construction respectively recited in the following claims are employed.

I therefore particularly point out and distinctly claim as my invention—

1. In a chain-making machine, the combination, with the guideway for the formed link arranged at right angles to the path of the stock, of a traveling link-forming head having means for forcing it into said guideway, and thereby double the stock to form the eye of a chain-link, substantially as set forth.

2. In a chain-making machine, the combination of stock-feeding mechanism, mechanism arranged in the path of the stock for forming one eye of the chain-link, a link-forming guideway transverse to the path of the stock, and a movable link-forming head having means for moving it toward and into said guideway, substantially as set forth.

3. In a chain-making machine, the combination of stock-feeding mechanism, a stationary mandrel in the path of the stock, a rotary eye-forming head opposite said mandrel, a link-forming guideway transverse to the path of the stock, and a movable link-forming head having means for moving it toward and into said guideway, substantially as set forth.

4. In a chain-making machine, the combination of a stationary cutter and a stationary end-bending head at one side of the path of the stock, with an opposite reciprocating cutter and end-bending head, said elements severing the link-blank and bending the end of one link-eye, substantially as set forth.

5. In a chain-making machine, the combination of a stationary cutter, a stationary end-bending head, and a stationary link-forming head, all arranged at one side of the path of the stock, with a reciprocating slide having secured upon it a cutter, an end-bending head, and link-forming head, all respectively opposite to and coacting with the stationary cutter and heads, substantially as set forth.

6. In a chain-making machine, the combination of a stock-feeding mechanism, a stationary mandrel in the path of the stock, a rotary eye-forming head opposite said mandrel, a stationary cutter, a stationary end-bending head, a link-forming guideway transverse to the path of the stock, and a reciprocating member carrying a cutter, an end-bending head, and a link-forming head respectively opposite to and coacting with said stationary cutter, head, and guideway, substantially as set forth.

7. In a chain-making machine, the combination of a stationary link-forming head, an opposite lug having means for rocking it, and a reciprocating link-forming head movable between said stationary head and lug, substantially as set forth.

8. In a chain-making machine, the combination of a stationary link-forming head, an opposite pivoted block having a recessed lug at one end of its upper edge and a cam enlargement at the opposite end of its lower edge, and a reciprocating slide having a link-forming head adapted to enter between the head and the lug and having a double cam adapted to engage the cam enlargement of the pivoted block, substantially as set forth.

9. In a chain-making machine, a feeding mechanism comprising two revolving feed-disks formed with registering and corresponding segmental enlargements upon their opposite edges, substantially as set forth.

10. In a chain-making machine, the combination of two intermeshing gear-wheels with feed-disks adjustably secured upon the gear-wheels and having each a segmental feed-tread, substantially as set forth.

11. In a chain-making machine, the combination of a stationary mandrel having a groove across its face, with a rotary eye-forming head arranged opposite said mandrel, substantially as set forth.

12. In a chain-making machine, the following coacting appliances, viz: a main shaft having two cranks, a rack-slide, a transverse slide carrying a link-forming head and a cutter, a connecting-rod pivoted to one crank upon the main shaft and to the rack-slide, a bell-crank lever, a rod pivoted to the rack-slide and to the bell-crank.lever, a connecting-rod between the bell-crank lever and the transverse slide, a vertically-movable slide, end-wrapping jaws arranged to bend the free ends of the links, a pivoted lever, and connecting-rods between one end of said lever and the vertical slide and between the other end of the lever and the crank upon the main shaft, substantially as set forth.

13. In a chain-making machine, the combination, with a rotary shaft provided with an eye-forming head and a pinion, of a reciprocating slide formed with a cogged rack engaging said pinion, substantially as set forth.

14. In a chain-making machine, the combination of a feeding mechanism and a spring-pressed stock-guide normally laterally deflected out of the line of feed, substantially as set forth.

15. In a chain-making machine, the combination of a feeding mechanism, a stationary cutter at one side of the line of feed, an opposite reciprocating cutter, and a stock-guide having a spring which normally deflects said guide out of the line of feed and toward the reciprocating cutter, substantially as set forth.

16. In a chain-making machine, the combination of a block formed with a link-holding groove and with recesses at the sides of said groove, and link-holding jaws pivoted in said lateral recesses and having means for rocking their upper holding ends toward and from said groove, substantially as set forth.

17. In a chain-making machine, the combination of feeding mechanism, a spring-pressed stock-guide normally laterally deflected out of the line of feed, a stationary cutter and an end-bending head at one side of the line of feed, and a reciprocating-machine element provided with a cutter and an end-bending head opposite to said stationary cutter and head and constructed to engage and press into the line of feed said spring-pressed guide, substantially as set forth.

18. In a chain-making machine, the combination, with a block formed with a link-holding groove, of oscillating end-wrapping jaws pivoted at opposite sides of said groove and having means for rocking them toward and from said groove, substantially as set forth.

19. In a chain-making machine, the combination of a block formed with a link-holding groove and with recesses at opposite sides of said groove, link-holding jaws pivoted within said recesses and having means for rocking their upper holding ends toward and from said groove, and oscillating end-wrapping jaws arranged above said groove and at an angle to the same and provided with means for rocking them toward and from said groove, substantially as set forth.

20. In a chain-making machine, the combination of a block formed with a link-holding groove and with recesses at opposite sides of said groove, link-holding jaws pivoted within said recesses and having springs bearing against their lower ends, and a reciprocating cam-plate beneath said block and provided with cam-recesses engaging the lower ends of said holding-jaws, substantially as set forth.

21. In a chain-making machine, the combination of a grooved link-holding block, a support above said block, a vertically-reciprocating slide in said support, arms pivoted upon said support, end-wrapping jaws pivoted to the lower ends of said arms, rock-shafts journaled in said support and having arms at one end pivoted to said jaws and arms at the other ends, and links pivoted to said latter arms and to the vertically-reciprocating slide, substantially as set forth.

In testimony that I claim the foregoing to be my invention I have hereunto set my hand this 12th day of July, A. D. 1890.

FRANK P. CADY.

Witnesses:
N. S. AMSTUTZ,
J. B. FAY.